Figure 1:
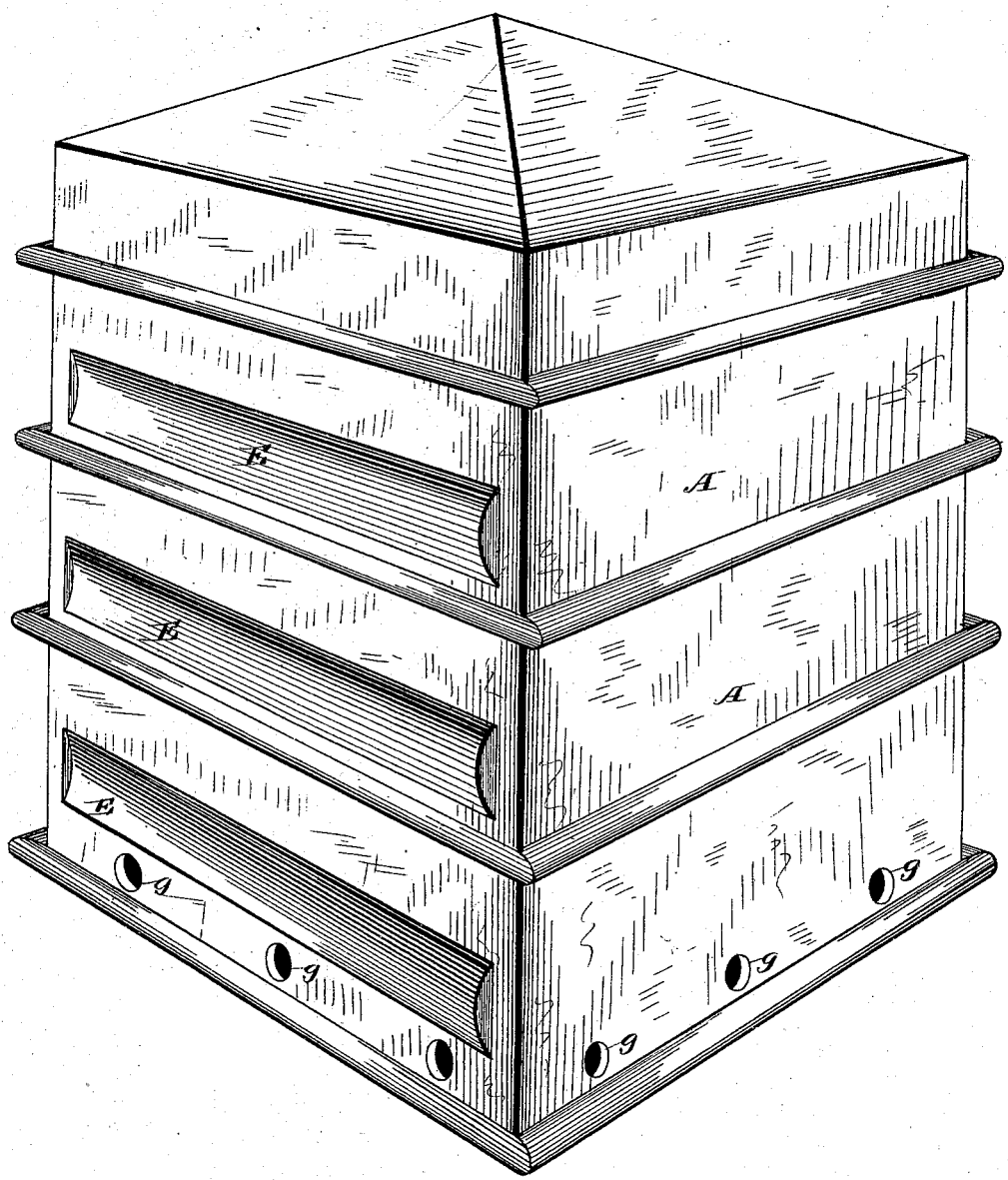

(Model.)

J. M. BURGHARDT.
FRUIT DRIER.

No. 255,768.

3 Sheets—Sheet 1.

Patented Apr. 4, 1882.

WITNESSES
Herman Moran.
Geo. D. Seymour.

INVENTOR
John. M. Burghardt
by N. A. Seymour.
ATTORNEY (Model.)
J. M. BURGHARDT.
FRUIT DRIER.
No. 255,768. Patented Apr. 4, 1882.
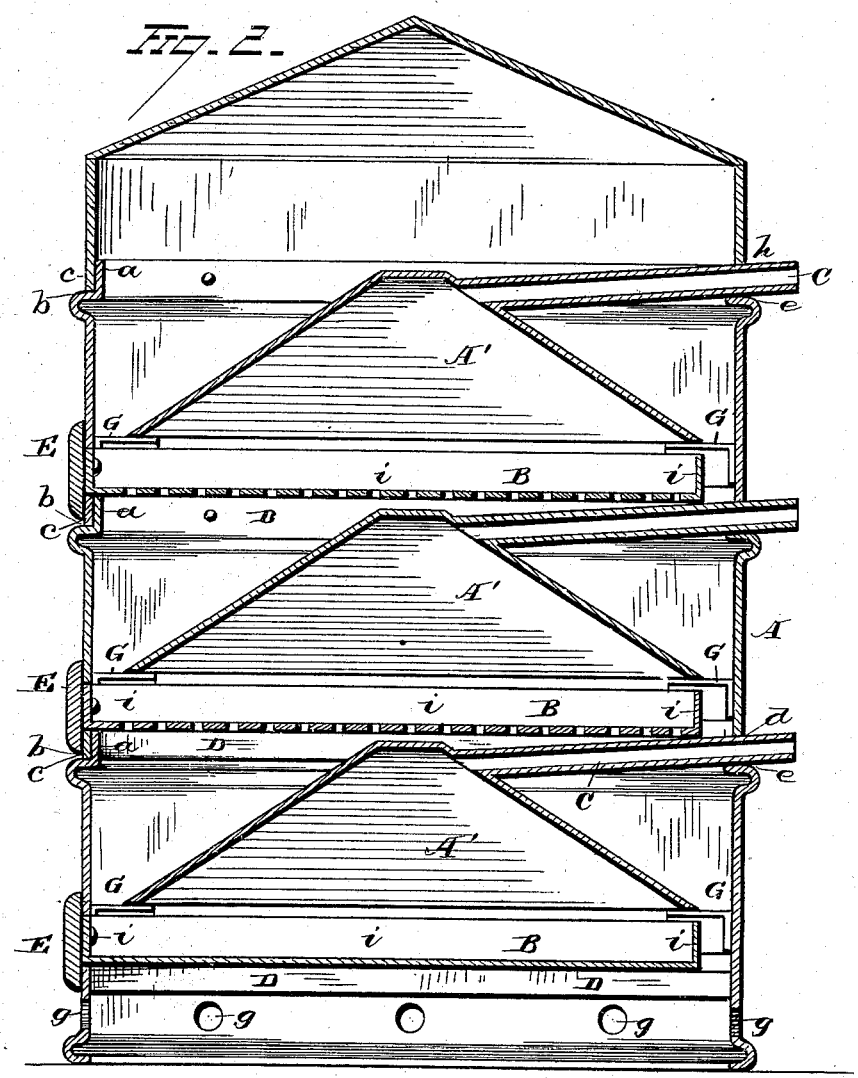
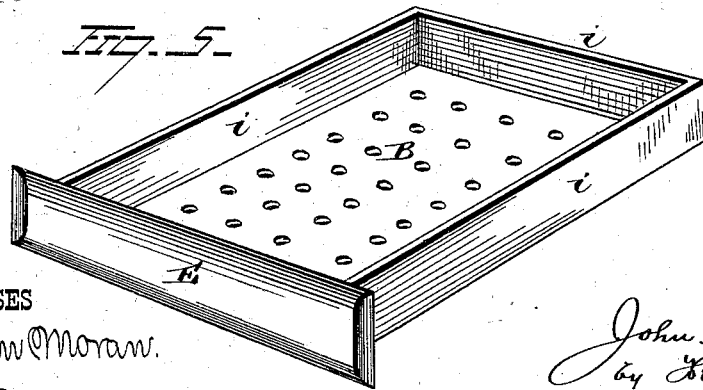
WITNESSES
Herman Moran.
Geo. D. Seymour.
INVENTOR
John M. Burghardt
by Henry A. Seymour
ATTORNEY

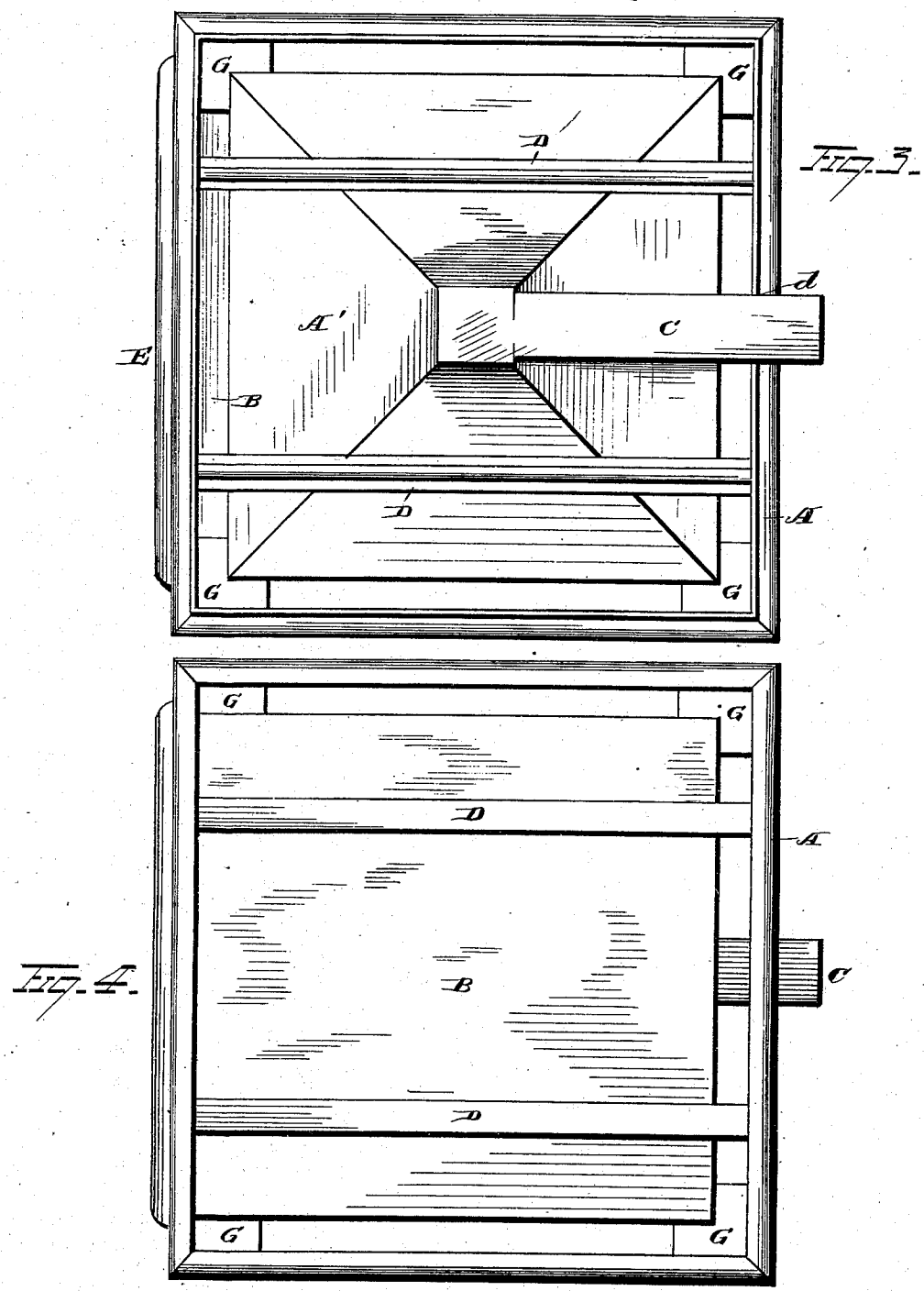

UNITED STATES PATENT OFFICE.

JOHN M. BURGHARDT, OF STOCKBRIDGE, MASSACHUSETTS.

FRUIT-DRIER.

SPECIFICATION forming part of Letters Patent No. 255,768, dated April 4, 1882.

Application filed July 22, 1881. (Model.)

*To all whom it may concern:*

Be it known that I, JOHN M. BURGHARDT, of Stockbridge, in the county of Berkshire and State of Massachusetts, have invented certain new and useful Improvements in Fruit-Driers; and I do hereby declare the following to be a full, clear, and exact description of the invention, such as will enable others skilled in the art to which it pertains to make and use it, reference being had to the accompanying drawings, which form part of this specification.

My invention relates to an improvement in fruit-driers.

Heretofore a majority of the machines have been constructed with a series of trays or sieves placed one above the other in such a manner that the steam or moisture escaping from the lower tiers of trays passes up through the trays above before it escapes from the machine, thereby making the drying a very slow and imperfect process, the fruit in the upper trays still containing considerable water when removed from the drier. Another objection to the machines heretofore used is that they are constructed mostly of wood, and are liable at any time to take fire.

The object of my invention is to overcome the objections above noted by constructing the machine in sections and providing each section with means whereby the vapor or moisture arising from each tray containing the fruit is conducted therefrom to the outside of the machine, below the next tray above, thereby producing a better article, and saving considerable time and labor, while at the same time it possesses the advantages of compactness in structure, and also durability and cheapness.

With these ends in view my invention consists in certain details in construction and combinations of parts, as will be more fully described, and pointed out in the claims.

In the accompanying drawings, Figure 1 is a perspective view of my improved apparatus. Fig. 2 is a vertical sectional view. Fig. 3 is a plan view with the top section removed. Fig. 4 is a bottom plan view with the lower tray removed, and Fig. 5 is a view of one of the trays.

A represents the wall or casing of the drier, B the trays, and C the exit-pipes.

The sheet-metal casing A is made up in sections of any size whatever, and each section is provided with one tray, or one or more trays placed on the same plane, so that the moisture or vapor from one tray will not have to pass through another tray before escaping from the machine. Each section is quadrangular or rectangular in shape, and is provided with an opening for the passage of the trays, and all the sections excepting the top one are provided with the supports D, on which the trays B rest. The upper end of each section is provided with a flange, a, around which the lower edge, c, of the next upper section fits, and a shoulder, b, against which the edge c rests, and each flange a is cut away at d for the passage of the exit-pipe C, and each lower edge is cut away at e, which adapts the sections to fit closely and snugly together.

G are projections rigidly secured in the corners of each section, just above the openings for the trays, to which the hoods A' are secured. These hoods are smaller than the interior of the drier and about the size of the trays over which they rest, thereby allowing a free circulation of air around the outside of the trays.

Each hood is provided with inclined sides converging upward toward a point. These hoods rest immediately over the trays containing the fruit, and as the vapor arises from the drying fruit it strikes the under surface of the hood, and is carried upward to the center of the same and out through the exit-pipe, which latter connects with the hood at this point.

The lowest section of the drier is formed somewhat higher than the other section, and is provided with openings g, for the admission of air, or dampers, by which the amount of air taken in is regulated. This lowest section is also provided with the bars D above and below the tray B, on which the trays of this and the next section above rest. The upper or top section is not provided with the bars.

The top of the drier is similar in shape to the hoods already described, and is provided with a flange cut away at h, which fits over the exit-pipe.

The trays B are constructed of sheet metal, and are rectangular in shape, and adapted to enter the openings in the sections when it is desired to dry the fruit placed thereon, and to be removed therefrom when the process of drying is completed. The sides and ends i are also formed of sheet metal, while the outer ends are provided with facings E of wood, which prevents the handles which are secured thereto from becoming highly heated, and allows the trays to be conveniently handled.

If desired, all the trays may be provided with perforated bottoms, which will allow the hot air rising up to freely pass up under and beneath the fruit and thoroughly dry all alike; but I prefer to provide the lowest tray, or the one nearest the fire, with a solid bottom, as the heat at this point is sufficient to thoroughly dry the fruit without allowing it to pass through the same. When all the sections have been completed they are riveted together, which forms a compact and neat oven.

My improved device can be constructed for domestic use as well as for more extensive uses, and in this case would be made of lighter material, so that it could be easily lifted and placed on an ordinary cook-stove. So, also, can the wall or casing be constructed of brick; but thick metallic walls answer all the required purposes, and take up less room. In either case, however, they are permanently set over a furnace or hot-air stove and provided with openings at the bottom for the free entrance of air.

By constructing a drier as above described a better quality of dried fruit is obtained than can be produced from the machines ordinarily employed, as all the moisture arising from one tray is immediately carried to the outside of the machine without passing through the next tray above, consequently leaving the fruit in the upper trays with nearly as much water therein when the process is completed as it contained when first introduced into the machine. A current of cold air is constantly passing up the drier and out through the exit-pipes above the trays without being allowed to stagnate in the drier, which also aids in producing a perfect product.

It is evident that slight changes in the construction of my improved device may be resorted to without departing from the spirit of my invention, and hence I would have it understood that I do not limit myself to the exact construction of parts shown and described; but, Having fully described my invention, what I claim as new, and desire to secure by Letters Patent, is—

1. The combination, with the trays arranged one above the other, of a hood supported above each tray by flanges or projections within the casing, as described, and provided with an exit-pipe extending through the casing, substantially as set forth.

2. The combination, with a fruit-drier formed of sections fitted one upon another and each provided with a tray, of a hood having inclined sides and an exit-pipe, and supported within the sections above the trays upon corner projections or flanges, substantially as set forth.

3. The combination, with the sections, each provided with a shoulder and flange for the attachment of the section next above it, of the trays and the hoods having inclined sides, and exit-pipes extending through the sides of the sections, substantially as set forth.

4. The combination, with the sections and trays, of hoods supported above the trays, and exit-pipes passing through cut-away portions of the section-joints, substantially as set forth.

In testimony that I claim the foregoing I have hereunto set my hand this 12th day of July, 1881.

JOHN M. BURGHARDT.

Witnesses:
W. A. SEYMOUR,
D. R. WILLIAMS.